United States Patent
Yasue

(10) Patent No.: US 7,349,168 B2
(45) Date of Patent: Mar. 25, 2008

(54) DATA STORAGE MEDIUM LIBRARY, DATA STORAGE MEDIUM MAGAZINE, HOST DEVICE, DATA STORAGE MEDIUM LIBRARY SYSTEM, METHOD OF OPERATING A DATA STORAGE MEDIUM LIBRARY, METHOD OF OPERATING A HOST DEVICE, METHOD OF OPERATING A DATA STORAGE MEDIUM LIBRARY SYSTEM, SIGNAL-BEARING MEDIUM EMBODYING A PROGRAM OF DATA STORAGE MEDIUM LIBRARY, AND SIGNAL-BEARING MEDIUM EMBODYING A PROGRAM OF HOST DEVICE

(75) Inventor: Yoshihiko Yasue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/304,624

(22) Filed: Dec. 16, 2005

(65) Prior Publication Data
US 2006/0152841 A1   Jul. 13, 2006

(30) Foreign Application Priority Data
Jan. 13, 2005   (JP)   ............... 2005-006266

(51) Int. Cl.
G11B 15/18   (2006.01)
G11B 15/68   (2006.01)
G11B 19/02   (2006.01)

(52) U.S. Cl. ......................................... 360/69; 360/92
(58) Field of Classification Search ............ 369/30.42, 369/30.53–30.54, 30.66–30.68, 30.77–30.78, 369/30.83
See application file for complete search history.

(56) References Cited

U.S. PATENT DOCUMENTS 6,950,723 B2 * 9/2005 Gallo et al. ................. 700/214
2005/0013035 A1 * 1/2005 Crighton et al. .............. 360/69

FOREIGN PATENT DOCUMENTS

JP   6-36434   2/1994
JP   8-167278   6/1996

* cited by examiner

Primary Examiner—William Korzuch
Assistant Examiner—Jason Olson
(74) Attorney, Agent, or Firm—McGinn IP Law Group, PLLC

(57) ABSTRACT

A data storage medium library includes a plurality of magazines. The magazines include a plurality of cells. An addressor addresses a logical cell address of the cell that stores a data storage medium. The logical cell address indicates what number the cell is as counted in ascending order in the cells that store data storage media. A reporter reports the logical cell address to a host device. When the addressor counts, the addressor skips an empty cell.

25 Claims, 13 Drawing Sheets

TABLE=A1B0

| MAGAZINE | A | | | | | | | | | | B | | | | | | | | | |
|---|---|---|---|---|---|---|---|---|---|---|---|---|---|---|---|---|---|---|---|---|
| PHYSICAL CELL ADDRESS | 1 | 2 | 3 | 4 | 5 | 6 | 7 | 8 | 9 | 10 | 11 | 12 | 13 | 14 | 15 | 16 | 17 | 18 | 19 | 20 |
| LOGICAL CELL ADDRESS | 1 | – | – | – | – | – | – | – | – | – | – | – | – | – | – | – | – | – | – | – |

Figure 5A

TABLE=A2B1

| MAGAZINE | A | | | | | | | | | | B | | | | | | | | | |
|---|---|---|---|---|---|---|---|---|---|---|---|---|---|---|---|---|---|---|---|---|
| PHYSICAL CELL ADDRESS | 1 | 2 | 3 | 4 | 5 | 6 | 7 | 8 | 9 | 10 | 11 | 12 | 13 | 14 | 15 | 16 | 17 | 18 | 19 | 20 |
| LOGICAL CELL ADDRESS | 1 | 2 | – | – | – | – | – | – | – | – | 3 | – | – | – | – | – | – | – | – | – |

Figure 5B (T1)
TABLE=A5B5

| MAGAZINE | A | | | | | | | | | | B | | | | | | | | | |
|---|---|---|---|---|---|---|---|---|---|---|---|---|---|---|---|---|---|---|---|---|
| PHYSICAL CELL ADDRESS | 1 | 2 | 3 | 4 | 5 | 6 | 7 | 8 | 9 | 10 | 11 | 12 | 13 | 14 | 15 | 16 | 17 | 18 | 19 | 20 |
| LOGICAL CELL ADDRESS | 1 | 2 | 3 | 4 | 5 | – | – | – | – | – | 6 | 7 | 8 | 9 | 10 | – | – | – | – | – |

Figure 5C (T2)
TABLE=A6B5

| MAGAZINE | A | | | | | | | | | | B | | | | | | | | | |
|---|---|---|---|---|---|---|---|---|---|---|---|---|---|---|---|---|---|---|---|---|
| PHYSICAL CELL ADDRESS | 1 | 2 | 3 | 4 | 5 | 6 | 7 | 8 | 9 | 10 | 11 | 12 | 13 | 14 | 15 | 16 | 17 | 18 | 19 | 20 |
| LOGICAL CELL ADDRESS | 1 | 2 | 3 | 4 | 5 | 6 | – | – | – | – | 7 | 8 | 9 | 10 | 11 | – | – | – | – | – |

Figure 5D

TABLE=AABA

| MAGAZINE | A | | | | | | | | | | B | | | | | | | | | |
|---|---|---|---|---|---|---|---|---|---|---|---|---|---|---|---|---|---|---|---|---|
| PHYSICAL CELL ADDRESS | 1 | 2 | 3 | 4 | 5 | 6 | 7 | 8 | 9 | 10 | 11 | 12 | 13 | 14 | 15 | 16 | 17 | 18 | 19 | 20 |
| LOGICAL CELL ADDRESS | 1 | 2 | 3 | 4 | 5 | 6 | 7 | 8 | 9 | 10 | 11 | 12 | 13 | 14 | 15 | 16 | 17 | 18 | 19 | 20 |

Figure 5E

313 LOGICAL CELL ADDRESS/LABEL CONTENT MEMORY UNIT

| LOGICAL CELL ADDRESS | LABEL CONTENT |
|---|---|
| 1 | BUSINESS 1 |
| ⋮ | ⋮ |
| 6 | BUSINESS 6 |
|  |  |

Figure 8

314 STORED NUMBER OF ROLLS MEMORY UNIT

| MAGAZINE | NO OF ROLLS STORED |
|---|---|
| A | 6 |
|  |  |

Figure 9

313 LOGICAL CELL ADDRESS/LABEL CONTENT MEMORY UNIT

| LOGICAL CELL ADDRESS | LABEL CONTENT |
|---|---|
| 1 | BUSINESS 1 |
| ⋮ | ⋮ |
| 6 | BUSINESS 6 |
| 7 | PERSONNEL 1 |
| ⋮ | ⋮ |
| 11 | PERSONNEL 5 |
|  |  |

Figure 10

314 STORED NUMBER OF ROLLS MEMORY UNIT
| MAGAZINE | NO. OF ROLLS STORED |
|---|---|
| A | 6 |
| B | 5 |
|  |  |
Figure 11
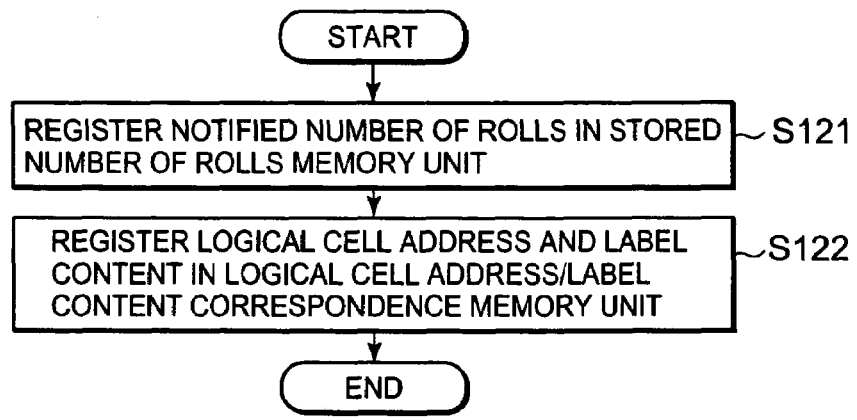
Figure 12
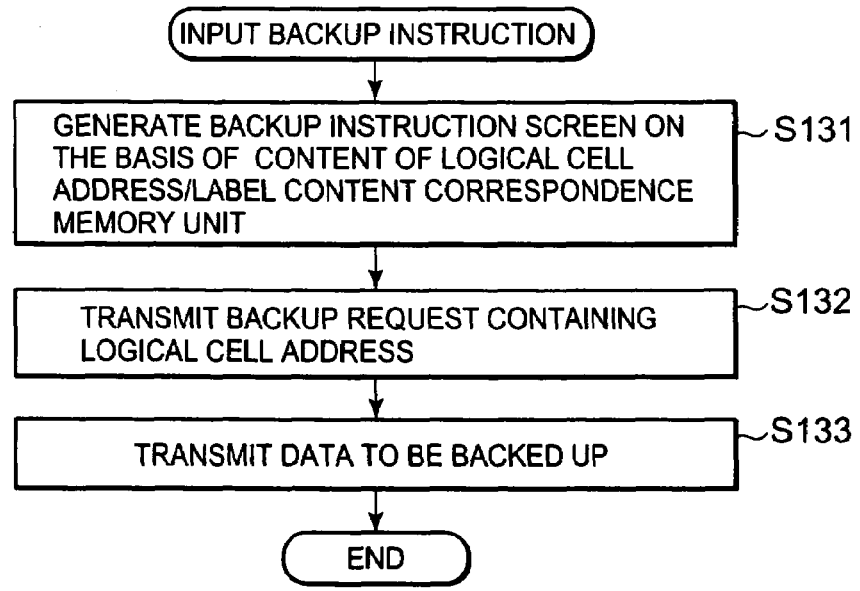
Figure 13

DATA STORAGE MEDIUM LIBRARY, DATA STORAGE MEDIUM MAGAZINE, HOST DEVICE, DATA STORAGE MEDIUM LIBRARY SYSTEM, METHOD OF OPERATING A DATA STORAGE MEDIUM LIBRARY, METHOD OF OPERATING A HOST DEVICE, METHOD OF OPERATING A DATA STORAGE MEDIUM LIBRARY SYSTEM, SIGNAL-BEARING MEDIUM EMBODYING A PROGRAM OF DATA STORAGE MEDIUM LIBRARY, AND SIGNAL-BEARING MEDIUM EMBODYING A PROGRAM OF HOST DEVICE

BACKGROUND OF THE INVENTION

1. Field of the Invention

The present invention relates to a data storage medium library (e.g., a magnetic tape library, an optical disk library, etc.), a data storage medium library, a data storage medium magazine, a host device, a data storage medium library system, a method of operating a data storage medium library, a method of operating a host device, a method of operating a data storage medium library system, a signal-bearing medium embodying a program of a data storage medium library, and a signal-bearing medium embodying a program of a host device. The data storage library may include a plurality of magazines each having a plurality of cells. More particularly, the present invention relates to a data storage medium library (e.g., a magnetic tape library, an optical disk library, etc.) in which the maximum number of data storage media (e.g., rolls of magnetic tapes) is restricted by a program (e.g., a backup program) operating on a higher level device.

The present invention may be utilized in library apparatuses for use in backing up data in computer systems, for example.

2. Conventional Art

A data storage medium library (e.g., a magnetic tape library, an optical disk library, etc.) is provided in which a data storage medium (e.g., a magnetic tape cartridge) is stored in each of a plurality of cells provided in each magazine. When an instruction is received from a host (i.e., a higher level device), the designated data storage medium (e.g., a magnetic tape cartridge; hereinbelow, a magnetic tape cartridge will be described as an example of a data storage medium) is mounted on a drive to read or write data as is well known according to the conventional art.

Incidentally, while some of the conventional magnetic tape libraries have only one magazine fitted in a fixed manner (see Japanese Patent Application Laid-Open No. 6-36434, for instance), others may have a plurality of magazines each fitted detachably (see Japanese Patent Application Laid-Open No. 8-167278, for instance). In a magnetic tape library having a plurality of magazines fitted detachably, since a plurality of magnetic tape cartridges can be loaded or unloaded at the same time on a magazine-by-magazine basis, magnetic tape cartridges can be loaded or unloaded efficiently. Furthermore, as it is made possible to allocate one magazine to each media pool (a group of magnetic tape cartridges used for the same duty), the management of loading and unloading of magnetic tape cartridges is facilitated for a magnetic tape library which involves frequent loading and unloading in media pool units.

On the other hand, in a magnetic tape library, there may be a variety of models including a 10-roll model, a 20-roll model and a 40-roll model, classified by the maximum number of rolls a magnetic tape cartridge can store. However, there may be no model having the number of rolls required by the user. In this case the user, in anticipation of a likely increase in data quantity in the future, would select a model having a greater capacity (e.g., a maximum number) of rolls than is currently required.

SUMMARY OF THE INVENTION

Incidentally, some backup programs which operate on a higher level device to a magnetic tape library cannot be used unless the user enters into a license contract with the right holder (e.g., owner, exclusive licensee). Moreover, the license fee increases with the contracted number of data storage media (e.g., rolls of the magnetic tape cartridge).

When such a backup program is to be used, making the maximum number of rolls stored by the magnetic tape library to be the contracted number of rolls, would be disadvantageous to the user. For instance, although the maximum number of rolls stored by the magnetic tape library is 40, the number of rolls to be stored by the magnetic tape cartridge may be 32. In this case, if the maximum number of rolls stored by the magnetic tape library, which is "40", is made the contracted number of rolls, the license fee will be higher and accordingly disadvantageous to the user.

Thus, a conventional practice is to determine the contracted number of rolls on the basis of the largest physical cell address among the physical cell addresses assigned to the cells actually storing magnetic tape cartridges (e.g., the largest physical cell address). If it is supposed now that, as shown in FIG. 20 for instance, magnetic tape cartridges belonging to media pools m1, m2, m3 and m4 (e.g., there are 8 cartridges in each media pool, totaling 32 cartridges) are to be stored in cells of physical cell addresses "1" through "8", "9" through "16", "17" through "24" and "25" through "32", then the contracted number of rolls (cartridges will be 32 because the largest physical cell address is "32".

The reason for determining the contracted number of rolls according to the largest cell address is that, when turning on the power supply or loading a magazine, to perform inventorying from the smallest cell address to the largest physical cell address in the magnetic tape library and to notify the backup program operating on a higher level device of the presence or absence of a magnetic tape cartridge in each of the cells up to the largest physical cell address and, if present, what magnetic tape cartridge is stored. Thus, it is required to enable the backup program to recognize the presence or absence of a magnetic tape cartridge in each of the cells up to the largest physical cell address and, if present, what magnetic tape cartridge is stored.

Where magnetic tape cartridges containing 32 rolls are stored in cells of consecutive physical addresses "1" through "32" as shown in FIG. 20, the contracted number of rolls may be made identical with the number of actually stored rolls, thereby to make the license fee commensurate with the number of actually stored rolls.

However, in a case such as that shown in FIG. 20, for instance, magnetic tape cartridges belonging to the media pool m2 are divided between magazines A and B for storing, and magnetic tape cartridges belonging to the media pool m4 are divided between magazines C and D for storing, thereby making it impossible to allocate each media pool to one magazine. As a consequence, for instance where a magnetic tape cartridge belonging to the media pool m2 is to be loaded and unloaded, a plurality of magazines A and B will have to be loaded and unloaded, thereby resulting in complex management of loading and unloading of magnetic tape cartridges.

To solve the exemplary problem noted above and others, for instance, the magnetic tape cartridges belonging to the media pools m1 through m4 (there are 8 cartridges in each media pool, totaling 32 cartridges) can be stored in magazines A through D, as shown in FIG. 21. In such a case, however, since inventorying should cover up to the physical cell address "38" in which cells are actually stored, the contracted number of rolls should be 38 even though only 32 magnetic tape cartridges are actually stored.

Thus, in the case shown in FIG. 21, although it is possible to load and unload magnetic tape cartridges in media pool units, the contracted number of rolls surpasses the number of rolls in the actually-stored magnetic tape cartridges, thereby resulting in a relatively higher license fee. In other words, for example, if there is an empty slot except for the last magazine, the number of the cell which stores the tape cartridge cannot be recognized by the higher level device.

In addition, for example, a program executed in the higher level device may recognize only consecutive physical cell addresses. Such a program may recognize the physical cell addresses "9", "10", "19", "20", "29", and "30", although the cells of those physical addresses are empty. When the cell whose physical address is "9" is removed (i.e., to make the program cannot recognize the physical address "9"), the program cannot recognize the physical address "9" or greater.

In view of the foregoing and other exemplary problems, drawbacks, and disadvantages of the conventional techniques, it is an exemplary feature of the present invention to provide an exemplary data storage medium library that makes possible loading and unloading of the magnetic tape cartridge in media pool units, and allocating different magazines to each media pool, even though the number of rolls under a contract with the right holder of the program (e.g., the backup program) is the number of rolls in the magnetic tape cartridges actually stored in the magnetic tape library.

The present invention provides a data storage medium library including a plurality of magazines, the magazines including a plurality of cells, an addressor that addresses a logical cell address of the cell that stores a data storage medium, the logical cell address indicating what number the cell is as counted in ascending order in the cells that store data storage media, and a reporter that reports the logical cell address to a host device, wherein, when the addressor counts, the addressor skips an empty cell.

Each cell may be assigned a physical cell address which identifies each cell in the data storage library. The data storage medium library may further include a converter that finds out the physical cell address corresponding to a logical cell address, when a request including the logical cell address is sent from the host device.

The data storage medium library may further include a drive unit controller that controls a drive unit and a drive, so that the drive unit transports the data storage media stored in the cell of the physical cell address to a drive and the drive writes data sent from the host device onto the data storage medium.

The data storage medium library may further include a stored medium number detector that detects the number of the data storage media stored in each of the magazines. The converter may determines the physical cell address corresponding to the logical cell address on the basis of the number of the data storage media stored in each of the magazines detected by the stored medium number detector.

The data storage medium library may include a cell position correspondence table generator that generates a cell position correspondence table indicating correspondence between the logical cell address and the physical cell address on the basis of the number of the data storage media stored in each of the magazines detected by the stored medium number detector and the physical cell addresses of the cells in each of the magazines. The converter may determine a physical cell address corresponding to the logical cell address on the basis of the cell position correspondence table.

The data storage medium library may further include a reader that reads a label, and a boundary label that shows a boundary between a cell storing a medium and an empty cell. The stored medium number detector may detect the number of the data storage media stored in the magazine on the basis of the position where the reader reads the boundary label.

The data storage medium library may further include an inventorying drive unit controller that moves the reader from the leading cell of the magazine toward cells whose physical cell addresses are larger and makes the reader read the label at the inlet/outlet of each cell. The magazine may include a shutter capable of sliding on the front face of the magazine where the inlet/outlet of each of the cells is provided and being fixed in a form blocking the inlets/outlets of cells in any desired number from a larger of physical cell addresses downward. The shutter may include the boundary label for terminal point detection in a position matching the inlet/outlet of the cell whose physical cell address is smallest among those whose inlets/outlets are blocked.

The data storage medium library may further include an input device that inputs the number of the data storage media stored in each of the magazines. The stored medium number detector may detect the number of the data storage media stored in the magazine on the basis of the number of the data storage media stored in each of the magazines inputted from the input device.

The addressor may skip counting the empty cell found between adjacent ones of the cells storing a data storage medium.

The present invention also provides a data storage medium magazine including a plurality of cells that stores a data storage medium, and a shutter being slidable on the front face of the magazine where the inlet/outlet of each of the cells is provided and being fixed in a form blocking the inlets/outlets of cells in any desired number from a larger of the physical cell addresses downward, the shutter including a boundary label for terminal point detection in a position matching the inlet/outlet of the cell whose physical cell address is smallest among those whose inlets/outlets are blocked.

The present invention also provides a host device which includes a receiver that receives the logical cell address from a data storage medium library, and a transmitter that transmits a request including the logical cell address to the data storage medium library. The data storage medium library may include a plurality of magazines, the magazines including a plurality of cells, an addressor that addresses a logical cell address of a cell that stores a data storage medium, the logical cell address indicating what number the cell is as counted in ascending order in the cells that store a data storage medium, and a reporter that reports the logical cell address to a host device. When the addressor counts, the addressor may skip an empty cell.

The present invention also provides a data storage medium library system including a data storage medium library. The data storage medium includes a plurality of magazines, the magazines including a plurality of cells, an addressor that addresses a logical cell address of the cell that stores a data storage medium, the logical cell address indicating what number the cell is as counted in ascending order in the cells that store a data storage medium, and a reporter that reports the logical cell address to a host device. The host device includes a receiver that receives the logical cell address from a data storage medium library, and a transmitter that transmits a request including the logical cell address to the data storage medium library. When the addressor counts, the addressor skips an empty cell.

The present invention also provides a method of operating a data storage medium library. The method includes providing a plurality of magazines, the magazines including a plurality of cells, addressing a logical cell address of the cell that stores a data storage medium, the logical cell address indicating what number the cell is as counted in ascending order in the cells that store a data storage medium, reporting the logical cell address to a host device, and skipping an empty cell, when the addressor counts.

The method of operating a data storage medium library may further include providing the cell that is assigned a physical cell address which identifies each the cell in the data storage library, and finding out the physical cell address corresponding to a logical cell address, when a request including the logical cell address is sent from the host device.

The method of operating a data storage medium library may further include controlling a drive unit and a drive so that the drive unit transports the data storage media stored in the cell of the physical cell address to a drive and the drive writes data sent from the host device onto the data storage medium.

The method of operating a data storage medium library may further include detecting the number of the data storage media stored in each of the magazines, and determining the physical cell address corresponding to the logical cell address on the basis of the number of the data storage media stored in each of the magazines detected by the stored medium number detector.

The method of operating a data storage medium library may further include generating a cell position correspondence table indicating correspondence between the logical cell address and the physical cell address on the basis of the number of the data storage media stored in each of the magazines detected by the stored medium number detector and the physical cell addresses of the cells in each of the magazines, and determining a physical cell address corresponding to the logical cell address on the basis of the cell position correspondence table.

The method of operating a data storage medium library may further include providing a boundary label that shows a boundary between a cell storing a medium and an empty cell, reading the boundary label, and detecting the number of data storage media stored in the magazine on the basis of the positions where the reader reads the boundary label.

The method of operating a data storage medium library may further include moving the reader from the leading cell of the magazine toward cells whose physical cell addresses are larger and makes the reader read the label at the inlet/outlet of each cell, and providing a shutter with the magazine, the shutter being slidable on the front face of the magazine where the inlet/outlet of each of the cells is provided and is fixed in a form blocking the inlets/outlets of cells in any desired number from larger the physical cell addresses downward, the shutter includes the boundary label for terminal point detection in a position matching the inlet/outlet of the cell whose physical cell address is the smallest among those whose inlets/outlets are blocked.

The method of operating a data storage medium library may further include inputting the number of the data storage media stored in each of the magazines, detecting the number of the data storage media stored in the magazine on the basis of the number of the data storage media stored in each of the magazines inputted from the input device.

The method of operating a data storage medium library may include skipping counting the empty cell found between adjacent ones of the cells storing a data storage medium.

The present invention also provides a method of operating a host device. The method includes receiving the logical cell address from a data storage medium library, and transmitting a request including the logical cell address to the data storage medium library, in the data storage medium library providing a plurality of magazines, the magazines including a plurality of cells, addressing a logical cell address of the cell that stores a data storage medium, the logical cell address indicating what number the cell is as counted in ascending order in the cells that store a data storage medium. The method also includes skipping a cell, when the addressor counts, if the cell is empty, and reporting the logical cell address to a host device.

The present invention also provides a method of operating a data storage medium library system. The method includes providing a plurality of magazines, the magazines including a plurality of cells, addressing a logical cell address of the cell that stores a data storage medium, the logical cell address indicates what number the cell is as counted in ascending order in the cells that store a data storage medium, skipping a cell, when the addressor counts, if the cell is empty. The method also includes reporting the logical cell address to a host device, receiving the logical cell address from a data storage medium library, and transmitting a request including the logical cell address to the data storage medium library.

The present invention also provides a signal-bearing medium embodying a program of machine-readable instructions executable by a digital processing apparatus. The program causes a data storage medium library to perform a method. The method includes providing a plurality of magazines, the magazines including a plurality of cells, addressing a logical cell address of the cell that stores a data storage medium, the logical cell address indicating what number the cell is as counted in ascending order in the cells that store a data storage medium, reporting the logical cell address to a host device, and skipping an empty cell, when the addressor counts.

The present invention also provides a signal-bearing medium embodying a program of machine-readable instructions executable by a digital processing apparatus. The program causes a host device to perform a method. The method includes receiving the logical cell address from a data storage medium library, and transmitting a request including the logical cell address to the data storage medium library, in the data storage medium library providing a plurality of magazines, the magazines including a plurality of cells, addressing a logical cell address of the cell that stores a data storage medium, the logical cell address indicating what number the cell is as counted in ascending order in the cells that store a data storage medium, skipping a cell, when the addressor counts, if the cell is empty, and reporting the logical cell address to a host device.

[Exemplary Advantages of the Invention]

According to the invention, for example, it is made possible, even if the number of data storage media (e.g., rolls of the magnetic tape cartridge) actually stored in the data storage media library (e.g., magnetic tape library) is made the number of data storage medium (e.g., rolls) contracted for with the right holder (e.g., owner, exclusive licensee, etc.) of the program (e.g., the backup program) operating on the higher level device, to allocate a different magazine to each media pool and to load or unload data storage medium (e.g., magnetic tape cartridges) in media pool units. This results in easier management of the loading and unloading of data storage medium (e.g., magnetic tape cartridge).

In addition, for example, the program in the higher level device may recognize the physical cell addresses, even if the program in the higher level device can recognize only consecutive physical addresses.

Further according to the invention, for example, if the total number of rolls stored in different magazines is not greater than the contracted number of data storage media (e.g., rolls), even if the quantity of data (e.g., backup data) for any media pool increases and necessitates increasing the number of magnetic tapes, it may be possible to store a newly added data storage medium (e.g., magnetic tape cartridge) into a magazine allocated to the media pool.

For example, the data storage medium library may include a plurality of magazines, and the magazine may include a plurality of cells. The data storage medium library includes an addressor that addresses a logical cell address of the cell that stores a data storage medium. The logical cell address indicates what number the cell is as counted in ascending order in the cells that store data a storage medium. For example, when the addressor counts, the addressor skips an empty cell. Thus, cells are counted only if the cells store a data storage medium therein. The data storage medium library includes a reporter that reports the logical cell address to a host device.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

FIGS. 5A-5E show exemplary charts showing exemplary contents of a cell position correspondence table;

FIG. 8 shows an exemplary chart showing an exemplary content of logical cell address/label content memory unit 313;

FIG. 9 shows an exemplary chart showing an exemplary content of stored number of rolls memory unit 314;

FIG. 10 shows an exemplary chart showing an exemplary content of logical cell address/label content memory unit 313;

FIG. 11 shows an exemplary chart showing an exemplary content of stored number of rolls memory unit 314;

FIG. 12 shows an exemplary flow chart showing an exemplary processing by backup program 102 when it is notified of a logical cell address and a label content;

FIG. 13 shows an exemplary flow chart showing an exemplary processing by backup program 102 when a backup instruction is inputted;

FIG. 19 shows an exemplary flow chart showing an exemplary processing by inventory control unit 302a;

DETAILED DESCRIPTION OF THE EXEMPLARY EMBODIMENTS

[Exemplary Embodiments]

Next, exemplary embodiments of the present invention will be described.

In the exemplary embodiments, each of the cells of each magazine of the data storage medium library (e.g., magnetic tape library; hereinbelow the magnetic tape library will be described as an exemplary "data storage medium library") is provided, which may be assigned a physical cell address for uniquely identifying the cell.

At the time of turning on the power supply or loading a magazine, a reporting unit (e.g., means) reports, with respect to each of the cells in which a magnetic tape is actually stored out of the cells of each magazine that the magnetic tape library is provided with, the logical cell address indicating in what position the physical cell address of that cell is as counted in the ascending order. The reporting unit also reports magnetic tape identifying information for identifying the magnetic tape stored in that cell to a higher level device.

For instance, if magnetic tapes are stored in cells of physical cell addresses "1" through "8" and "11" through "18" and no magnetic tape is stored in cells of physical cell addresses "9" and "10", the reporting unit (e.g., means) will notify the higher level device of the logical cell addresses "1" through "8" because the cells of the physical cell addresses "1" through "8" are the first through eighth cells, as counted in the ascending order of physical cell addresses out of the cells storing magnetic tapes. The reporting unit also will notify the higher level device, with respect to cells of the physical cell addresses "11" through "18", of the logical cell addresses "9" through "16" because they are the cells of the ninth through 16th cells out of the cells storing magnetic tapes as counted in the ascending order of physical cell addresses.

Therefore, the higher level device will recognize the number of cells "16" in which magnetic tapes are actually stored as the largest physical cell address even though the actual largest physical cell address in the magnetic tape library is "18". The higher level device at the time of accessing the magnetic library (e.g., at the time of backing up) sends a request (e.g., a back up request) containing the logical cell address to the magnetic tape library.

In addition, for example, since a program executed in the higher level device recognize consecutive physical cell addresses "1" through "16", the program in the higher level device can recognize the physical cell addresses "1" through "16", even if the program in the higher level device can recognize only consecutive physical addresses.

Figure 20:
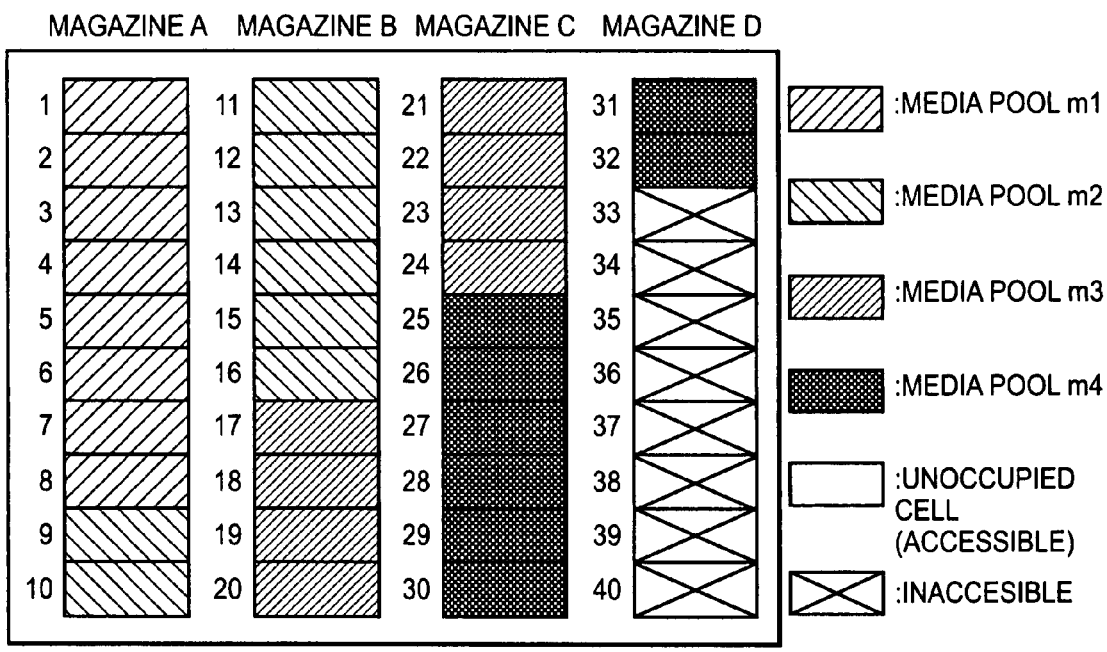
FIG. 20 shows an exemplary chart for illustrating exemplary problems with the conventional art.
Figure 21:
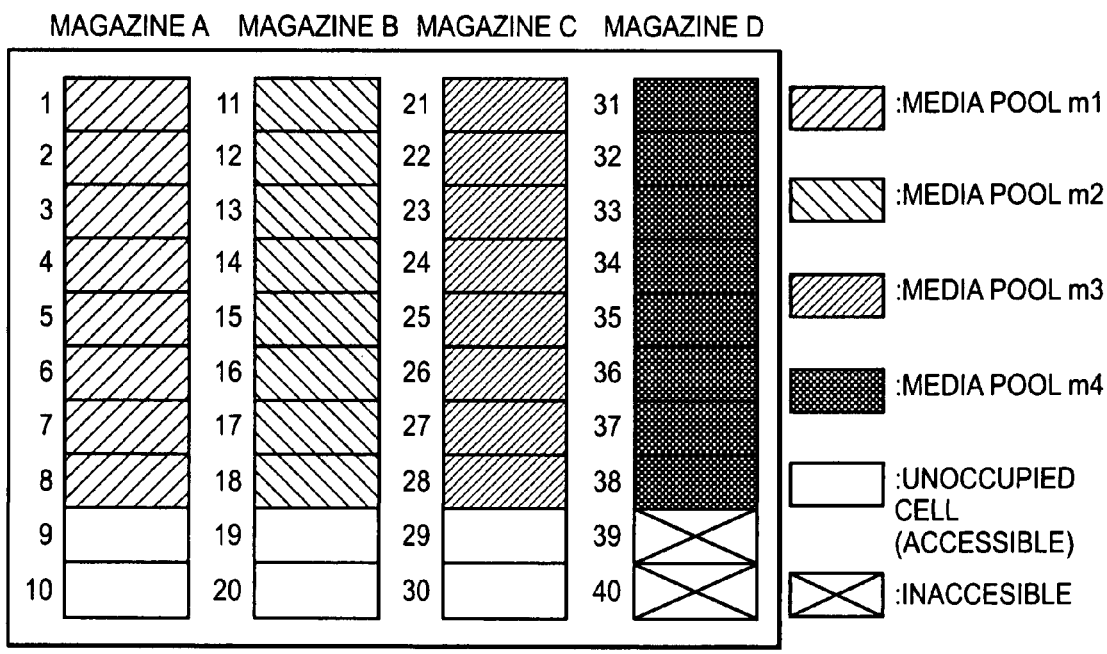
FIG. 21 shows another exemplary chart for illustrating problems with the conventional art.

In other words, for example, even when magnetic tape cartridges are stored as shown in FIG. 21, the higher level device connected to the magnetic tape library in the exemplary embodiments of the present invention recognize that magnetic tape cartridges are stored shown in FIG. 20. Thus, for example, the higher level device may recognize physical addresses as consecutive physical cell addresses and the maximum physical cell address as "32".

In the magnetic tape library, when the request (e.g., a backup request) is sent from the higher level device, a converting unit converts the logical cell address contained in the request (e.g., the backup request) into a physical cell address on the basis of the number of rolls of magnetic tapes stored in each magazine. A drive unit control unit (e.g., a backup drive unit control unit) fits the magnetic tape stored in the cell of the physical cell address found out by the converting unit to a drive. A data writing unit writes the backup data sent from the higher level device onto the magnetic tape fitted to the drive.

[Configuration of the First Exemplary Embodiment]

Figure 1:
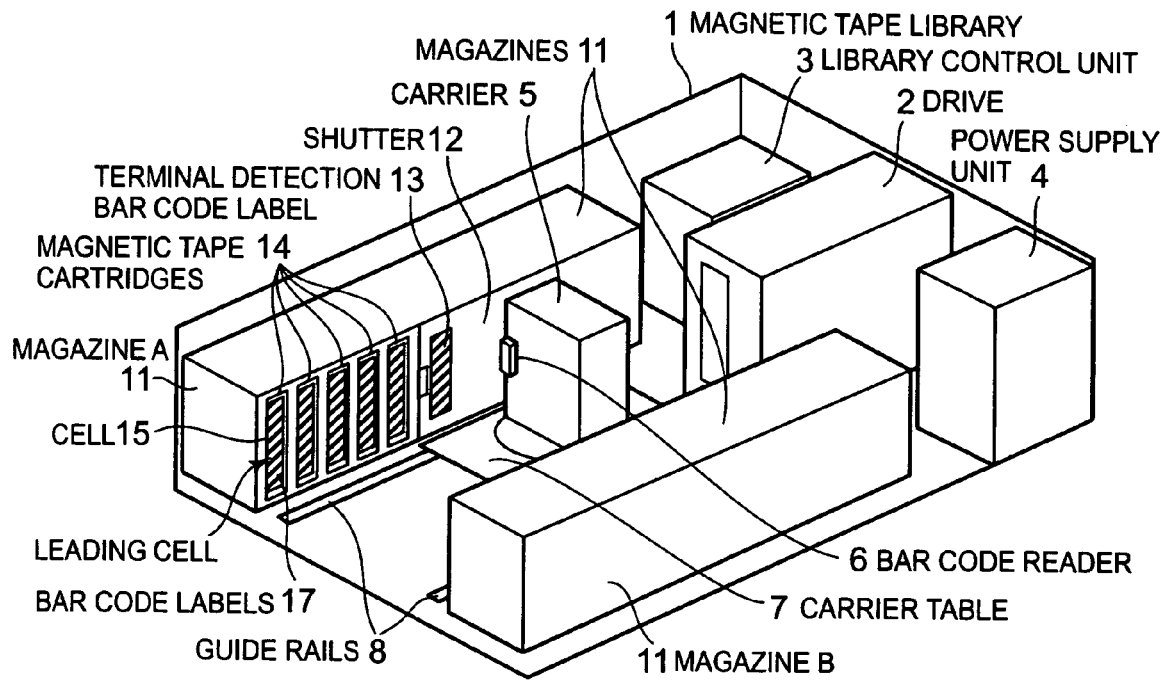
FIG. 1 shows an exemplary perspective view showing an example of a configuration of a first exemplary embodiment of a magnetic tape library 1 of the present invention.

FIG. 1 is an exemplary perspective view showing an exemplary configuration of a first embodiment of a data storage medium library (e.g., magnetic tape library 1) according to the invention.

As shown, magnetic tape library 1 of this exemplary embodiment may be provided with drive 2 which records and reproduces information, library control unit 3 which controls various parts in magnetic tape library 1 and, at the same time, exchanges information with a higher level device (not shown in FIG. 1), power supply unit 4 which supplies power to various parts in magnetic tape library 1, two magazines 11 which are detachable from magnetic tape library 1, carrier table 7 which moves along guide rails 8 and has a rotational mechanism, carrier 5 which is installed on carrier table 7 and conveys magnetic tape cartridges 14 between drive 2 and cells 15 disposed in magazines 11, and bar code reader 6 which reads bar code labels 17 stuck to magnetic tape cartridges 14 and terminal detection bar code label 13 stuck to shutter 12. Incidentally in the following description, when it is necessary to distinguish two magazines 11 from each other, one will be referred to as "magazine A" and the other, as "magazine B".

Next, the configuration of magazines 11 will be described with reference to FIGS. 2 and 3.

Figure 2:
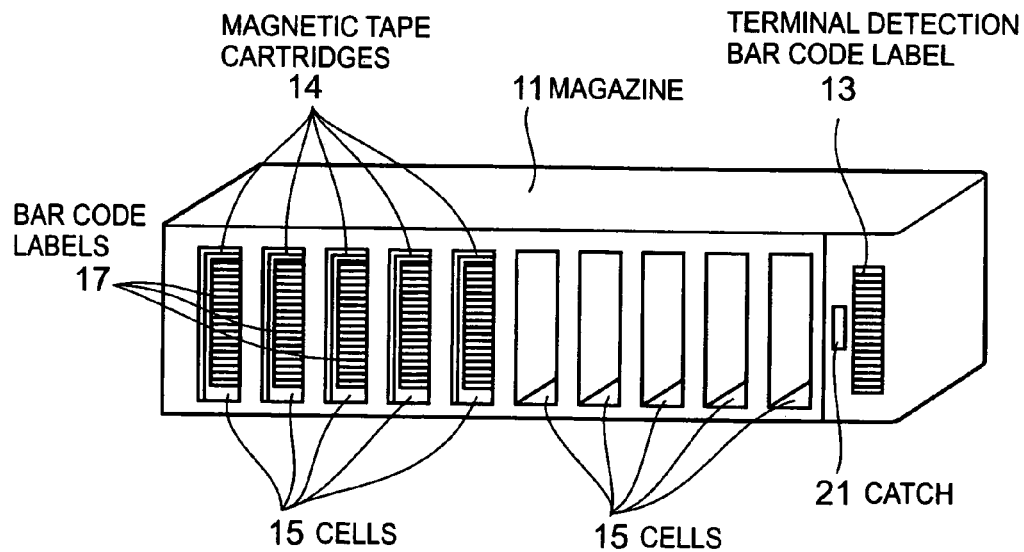
FIG. 2 shows an exemplary perspective view showing an exemplary state of magazine 11 when shutter 12 is opened.

Each of magazines 11 may have a plurality of cells 15 for storing magnetic tape cartridges 14 and shutter 12 having a sufficient length to block the inlets/outlets of all cells 15 within magazine 11 and normally arranged from the rear face to side faces of magazine 11, as shown in FIG. 2. Incidentally, for example, cells 15 may be disposed at equal intervals. Each of cells 15 of each of magazines 11 is assigned a physical cell address indicating in what position in the sequence in magnetic tape library 1 the cell is placed. In this exemplary embodiment, magazines A and B each have 10 cells each, and cells 15 of magazine A are assigned physical cell addresses "1" through "10", while cells 15 of magazine B are assigned physical cell addresses "11" through "20".

Figure 3:
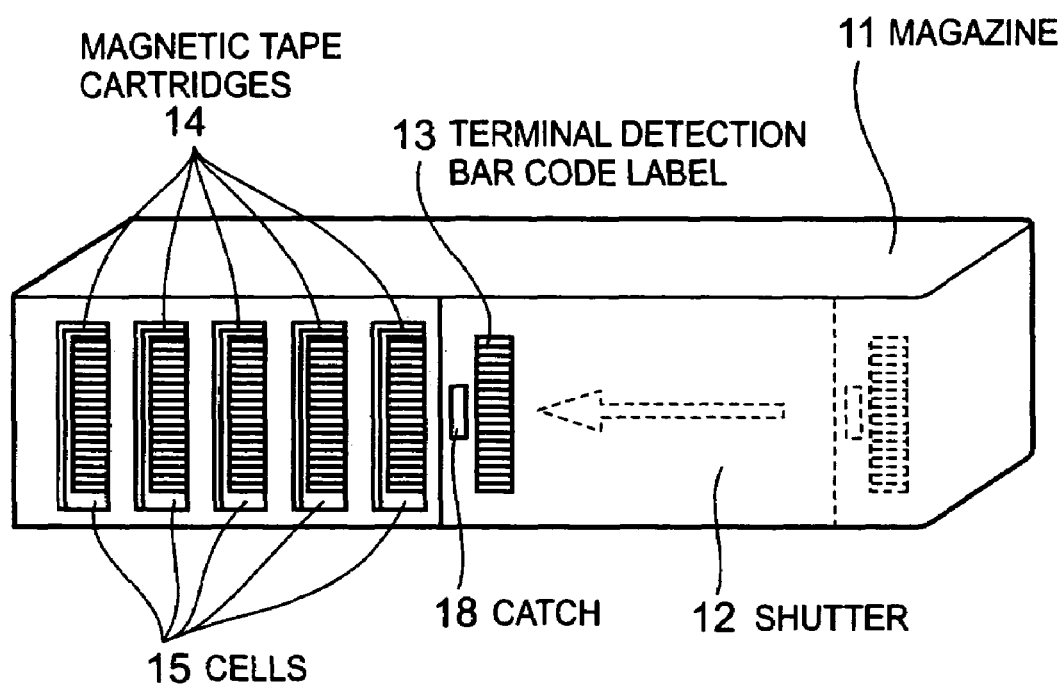
FIG. 3 shows an exemplary perspective view showing an exemplary state of magazine 11 when some cells 15 are blocked by shutter 12.

Shutter 12 can slide on the front face of magazine 11 in the direction of the arrow, as shown in FIG. 3, and can be fixed in any of the positions spaced at the intervals of cell widths. Thus, shutter 12 can be fixed to block the inlets/outlets of any number of cells in the descending order of physical cell addresses. Inlets/outlets of cells 15 are thereby blocked to make it physically impossible to load any magnetic tape cartridge 14 in respective cells. In this exemplary embodiment, magnetic tape cartridges 14 can be stored into cells 15 not covered by shutter 12.

Further, a catch 16 for the user to place his or her finger on in sliding shutter 12 is fitted to the front face of shutter 12, and terminal detection bar code label 13 is also fitted thereto. Incidentally, the fitting position of terminal detection bar code label 13 is such that, when shutter 12 covers inlets/outlets of cells 15, terminal detection bar code label 13 and the inlet/outlet of the cell whose physical cell address is the smallest out of the covered inlets/outlets overlap each other.

Figure 4:
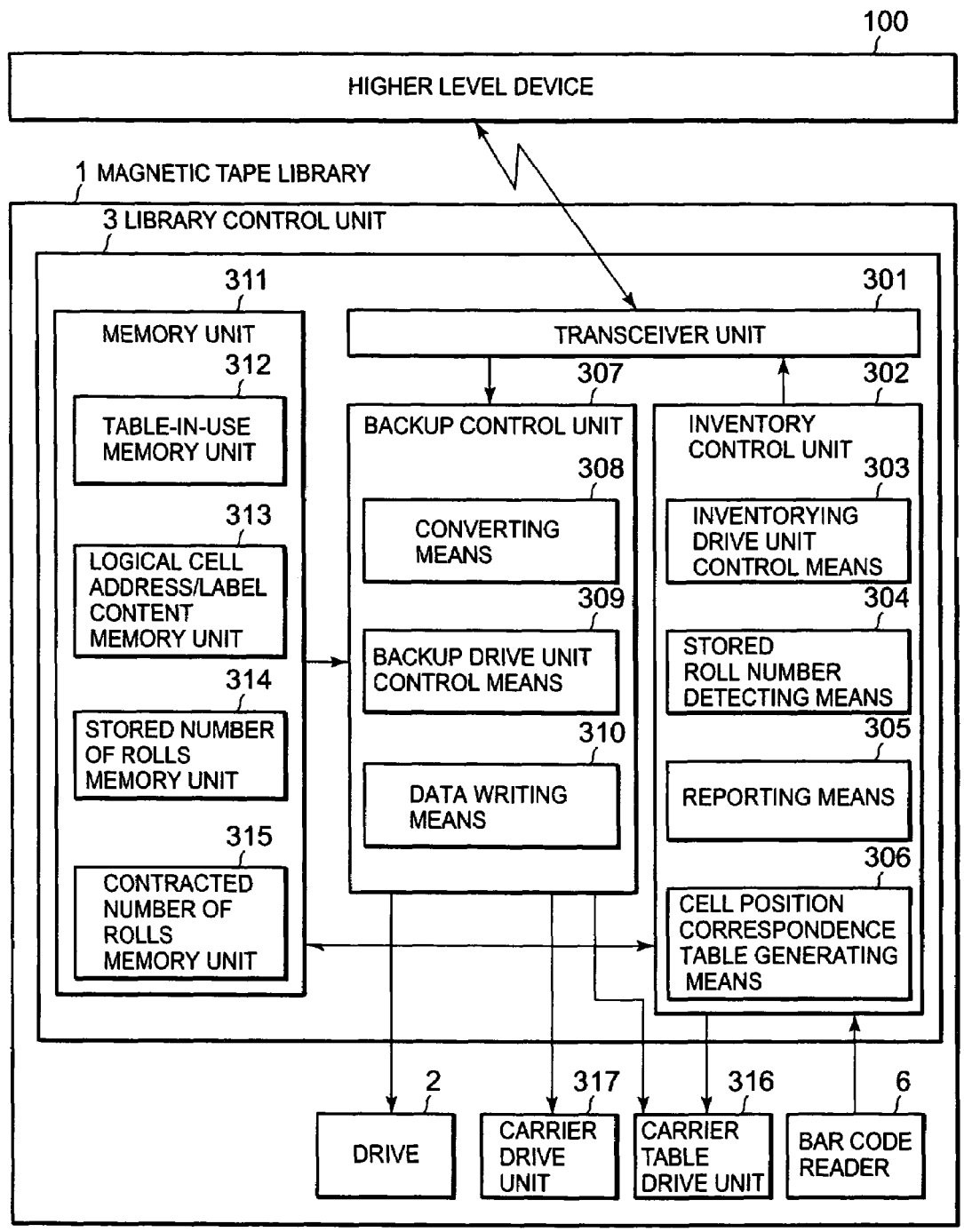
FIG. 4 shows an exemplary block diagram of an exemplary configuration of magnetic tape library 1.

Next will be described the configuration of library control unit 3 with reference to FIG. 4. Referring to FIG. 4, library control unit 3 is provided with transceiver unit 301, inventory control unit 302, backup control unit 307 and memory unit 311, for example.

Memory unit 311 is provided with, for example, table-in-use memory unit 312, logical cell address/label content memory unit 313, stored number of rolls memory unit 314 and contracted number of rolls memory unit 315.

In table-in-use memory unit 312, cell position correspondence tables, for example, are registered by cell position correspondence table generating means 306.

In logical cell address/label content memory unit 313, for example, logical cell addresses and the contents of bar code labels are registered, matched with each other, by stored roll number detecting means 304. Incidentally, a logical cell address constitutes information indicating in what position the physical cell address of that cell is as counted in the ascending order out of cells 15 in which magnetic tape cartridges 14 are actually stored. For example, when stored roll number detecting means 304 counts, the addressor skips an empty cell (e.g., the addressor skips counting the empty cell found between adjacent ones of the cells storing a data storage medium).

In stored number of rolls memory unit 314, for example, the number of rolls of magnetic tape cartridges 14 stored in each of magazines A and B is registered by stored roll number detecting means 304. In contracted number of rolls memory unit 315, the number of rolls contracted for with the right holder (e.g., owner or exclusive licensee) of the backup program is registered.

Transceiver unit 301 may have a function to exchange data and the like with higher level device 100 on which the backup program is operating.

Inventory control unit 302, may have a function to generate, at the time of turning on the power supply or loading a magazine, a cell position correspondence table on the basis of the number of rolls of magnetic tape cartridges 14 stored in each of magazines A and B, and a function to match contents read by bar code reader 6 from bar code labels 17 stuck to magnetic tape cartridges 14 with the logical cell addresses of magnetic tape cartridges 14 and to register them in logical cell address/label content memory unit 313.

The cell position correspondence table may be a table which matches the physical cell addresses assigned to cells 15 in each of magazines A and B, with the logical cell addresses recognized by the program (e.g., the backup program) on higher level device 100.

FIGS. 5(A) to 5(E) show examples of cell position correspondence table contents. Incidentally, FIGS. 5(A)-5(E) show cell position correspondence tables when the numbers of rolls stored in magazines A and B are respectively "1 roll and 0 roll", "2 rolls and 1 roll", "5 rolls and 5 rolls", "6 rolls and 5 rolls", and "10 rolls and 10 rolls".

Inventory control unit 302 having such functions may be provided with inventorying drive unit control means 303, stored roll number detecting means 304 and reporting means 305.

Inventorying drive unit control means 303, for example, may have a function to position bar code reader 6 fitted to carrier 5 before each of cells 15 in each of magazines A and B by controlling carrier table drive unit 316 for driving carrier table 7 on which carrier 5 is installed.

Stored roll number detecting unit 304, for example, may detect the number of rolls stored in magnetic tape cartridge 14 in each of magazines A and B on the basis of the result of reading by bar code reader 6 and store it into stored number of rolls memory unit 314, and may match the contents of bar code labels 17 read by bar code reader 6 with the logical cell addresses of cells 15 in which the magnetic tape cartridge 14 whose bar code labels 17 have been read are stored, and to register them in logical cell address/label content memory unit 313.

Reporting means 305, for example, may notify the backup program on higher level device 100 of contents registered in logical cell address/label content memory unit 313 (pairs each of a logical cell address and a label content) and to notify the backup program of the total number of rolls stored in each of magazines A and B, registered in stored number of rolls memory unit 314.

Cell position correspondence table generating means 306, for example, may generate a cell position correspondence table according to the number of rolls stored in each of magazines A and B, registered by stored roll number detecting means 304 in stored number of rolls memory unit 314 and to register it in table-in-use memory unit 312.

Control unit (e.g., backup control unit 307) may write, when a request (e.g., a backup request) containing any logical cell address has been sent from the backup program operating on higher level device 100, data (e.g., backup data) into magnetic tape cartridge 14 stored in cell 15 identified by the physical cell address corresponding to that logical cell address. Hereinbelow data backup will be described as an example of data accessing (e.g., data writing and reading) from higher level device 100 to magnetic tape library 1. Other data accesses may be performed using a converting means 308 described below or the like as would be known by one of ordinary skill in the art, after reading the present application.

Backup control unit 307 having these functions may be provided with converting means 308, backup drive unit control means 309 and data writing means 310, for example.

Converting means 308, for example, may reference, when a backup request containing any logical cell address has been sent from higher level device 100, a cell position correspondence table stored in table-in-use memory unit 312 and find out a physical cell address corresponding to that logical cell address.

Backup drive unit control means 309, for example may return a magnetic tape cartridge 14 fitted to drive 2 to its original cell 15 by controlling carrier table drive unit 316 or carrier drive unit 317, and to take out a magnetic tape cartridge 14 into which backup data are to be written from cell 15 of the physical cell address found out by converting means 308 and fit it to drive 2.

Data writing means 310, for example, may write backup data sent from higher level device 100 into a magnetic tape cartridge 14 fitted to drive 2.

Library control unit 3 having the above-mentioned exemplary functions can be realized with a computer and, when it is to be realized with a computer, it can be done in the following way for instance. A disk, semiconductor memory or some other recording medium recording a program to cause a computer to function as library control unit 3 is made available, and the computer is caused to read the program. The computer, by having its own operation controlled according to the program it has read, realizes on itself transceiver unit 301, inventory control unit 302 and backup control unit 307.

Figure 6:
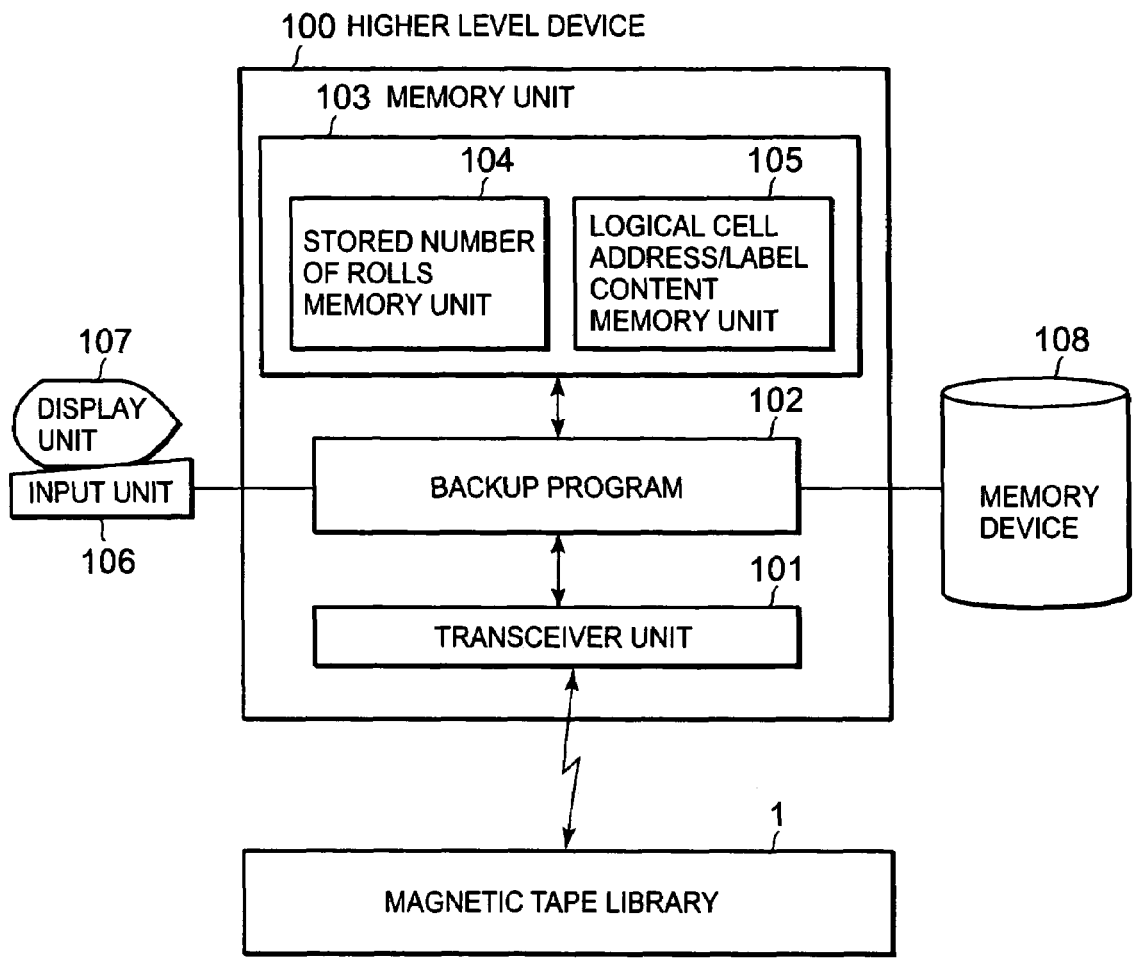
FIG. 6 shows an exemplary block diagram of an exemplary configuration of higher level device 100.

Next, the exemplary configuration of higher level device 100 will be described with reference to FIG. 6. Referring to FIG. 6, higher level device 100 is provided with, for example, transceiver unit 101, backup program 102 operating on higher level device 100, and memory unit 103 including stored number of rolls memory unit 104 and logical cell address/label content memory unit 105. To higher level device 100, input unit 106 such as a keyboard, display unit 107 such as an LCD, and memory device 108 such as a magnetic disk device, in which data for backing up magnetic tape library 1, may be connected, for instance.

Transceiver unit 101, for example, may exchange data with magnetic tape library 1.

Backup program 102, for example, may store into logical cell address/label content memory unit 105 the relationship of correspondence between logical cell addresses sent from magnetic tape library 1 and label contents, may store into the stored number of rolls memory unit 104 the number of rolls stored sent from magnetic tape library 1, may display on display unit 107 the contents of logical cell address/label content memory unit 105, may transmit to magnetic tape library 1 in accordance with an instruction inputted by the user from input unit 106 a backup request containing a logical cell address, and may transmit to magnetic tape library 1 backup data stored in memory device 108.

[Exemplary Operation of the First Exemplary Embodiment]

Next, the exemplary operation of this exemplary embodiment will be described.

First, the exemplary inventorying operation which is performed in magnetic tape library 1 when the power supply is turned on or a magazine is loaded, will be described.

Figure 7:
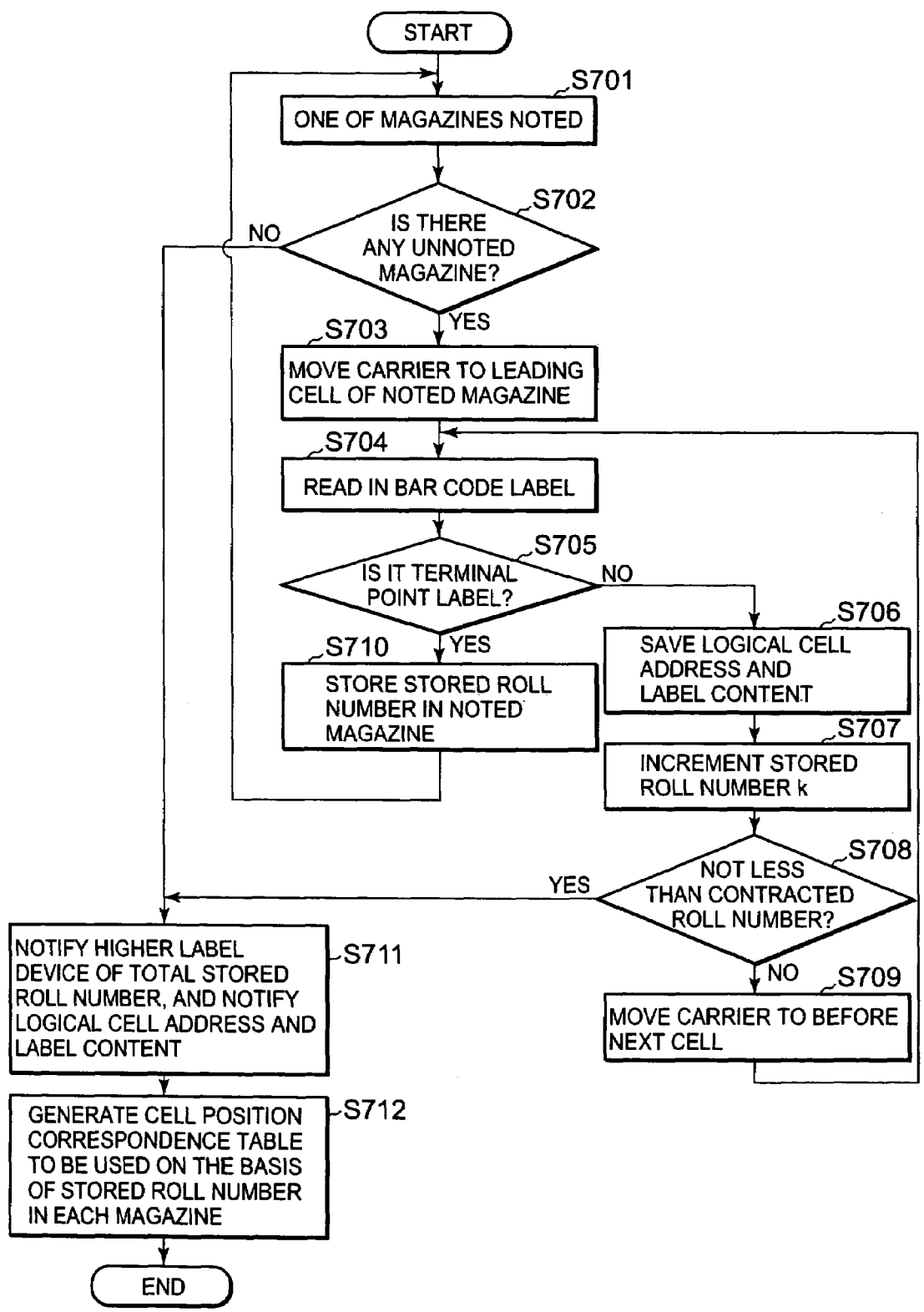
FIG. 7 shows an exemplary flow chart showing an exemplary processing by inventory control unit 302.

Inventory control unit 302 in library control unit 3, when it detects the turning-on of power supply of the loading of a magazine, notes one of magazines A and B, as shown in the flow chart of FIG. 7 (step S701). In doing so, inventory control unit 302 notes the cell having the smallest magazine physical cell address in the unnoted magazine. In this exemplary embodiment, as magazine A has cells 15 of physical cell addresses "1" through "10" and magazine B has cells of physical cell addresses "11" through "20", it notes magazine A.

Thereafter, inventorying drive unit control means 303 in inventory control unit 302 controls carrier table drive unit 316 to move carrier 5 to before the leading cell of the noted magazine A (step S703). This enables bar code reader 6 fitted to carrier 5 to read bar code label 17 of magnetic tape cartridge 14 stored in the leading cell (step S704). However, if the leading cell is blocked by shutter 12, terminal detection bar code label 13 will be read.

Stored roll number detecting means 304, when the result of reading by bar code reader 6 is inputted, determines whether the result of reading derives from bar code label 17 fitted to magnetic tape cartridge 14 or from terminal detection bar code label 13 fitted to shutter 12 (step S705).

If it is found from bar code label 17 fitted to magnetic tape cartridge 14 (NO at step S705), then the logical cell address of cell 15 in which magnetic tape cartridge 14 is stored ("1" in this case) is matched with the content of the read label. Then, they are registered in logical cell address/label content memory unit 313 (step S706). Thereafter, stored roll number detecting means 304 increments (e.g., adds+1) to the value of a variable k representing the number of rolls stored in the noted magazine, and further checks whether or not the number of rolls of the magnetic tape cartridges detected has reached the contracted number of rolls stored in contracted number of rolls memory unit 315 (steps S707 and S708). Incidentally, the initial value of the variable k is "0".

If it is determined that the contracted number of rolls has not been reached ("NO" at step S708), then inventorying drive unit control means 303 controls carrier table drive unit 316 to move carrier 5 adjacent (e.g., in front of) the cell next to the noted magazine A (e.g., the second cell 15) (step S709). Thus, bar code reader 6 will read either bar code label 17 or terminal detection bar code label 13 (step S704).

Stored roll number detecting means 304, if bar code label 17 has been read ("NO" at step S705), will perform the processes from the aforementioned step S706 onward. On the other hand, if terminal detection bar code label 13 has been read ("YES" at step S705), the value of the variable k representing the stored number of rolls will be matched with information representing noted magazine A, and they will be registered in stored number of rolls memory unit 314 (step S710). Further at step S710, the processing to reduce the value of the variable k representing the stored number of rolls to "0" is also performed.

If for instance magnetic tape cartridges 14 are stored in the first through sixth cells (cells having a physical cell address of "1" through "6"), totaling six, of magazine A and the contents of bar code labels 17 fitted to magnetic tape cartridges 14 stored in the cells of "1" through "6" (in physical cell address) are "Business 1" through "Business 6", then the contents of logical cell address/label content memory unit 313 and those of stored number of rolls memory unit 314 at the time of completion of processing on magazine A will be as shown in FIGS. 8 and 9, respectively.

Upon completion of the processing of step S710, inventory control unit 302 notes the next magazine B (step S701), and performs similar processing to that done on magazine A. If for instance magnetic tape cartridges 14 are stored in the first through fifth cells (cells having physical cell address of "11" through "15") of magazine B and the contents of bar code labels 17 fitted to magnetic tape cartridges 14 stored in the cells of "11" through "15" in physical cell address are "Personnel 1" through "Personnel 5", then the contents of logical cell address/label content memory unit 313 and those of stored number of rolls memory unit 314 at the time of completion of processing on magazine B will be as shown in FIGS. 10 and 11, respectively.

When there is no longer any unnoted magazine ("NO" at step S702), reporting means 305 notifies higher level device 100 of the total number of rolls of magnetic tape cartridges 14 stored in magnetic tape library 1, and pairs each of a logical cell address and a label content registered in logical cell address/label content memory unit 313 (step S711). Thereafter, cell position correspondence table generating means 306 generates a cell position correspondence table on the basis of the number of rolls stored in each of magazines A and B, registered in stored number of rolls memory unit 314, and registers the generated cell position correspondence table in table-in-use memory unit 312 (step S712).

If for instance the number of rolls stored in magazines A and B are "6" and "5", respectively, as shown in FIG. 11, then cell position correspondence table generating means 306 will generate such a cell position correspondence table as what is shown in FIG. 5(D). One exemplary method for generating a cell position correspondence table may be as follows.

First, cell position correspondence table generating means 306 notes magazine A having the cell of the smallest physical cell address in the unnoted magazines A and B, acquires "6", the number of rolls stored in the noted magazine A from stored number of rolls memory unit 314. As known from the physical cell addresses "1" through "10" assigned to the cells of the noted magazine A and from "6", the number of rolls stored, acquired from stored number of rolls memory unit 314 that magnetic tape cartridges are stored in the cells of "1" through "6" in physical cell address, and as the cells of "1" through "6" in physical cell address are the "first" through "sixth" cells out of the cells storing magnetic tape cartridges as counted from the smallest physical cell address upward, the physical cell addresses "1" through "8" and the logical cell addresses "1" through "6" are matched with each other as shown in FIG. 5(D).

Thereafter, cell position correspondence table generating means 306 notes magazine B having the cell of the smallest physical cell address out of the unnoted magazine B, and acquires "5", the number of rolls stored in noted magazine B, from stored number of rolls memory unit 314. As known from the physical cell address "II" through "20" assigned to the cells of noted magazine B and "5", the number of rolls stored in noted magazine B, acquired from stored number of rolls memory unit 314 that magnetic tape cartridges are stored in the cells of "11" through "15" in physical cell address, and as the cells of "11" through "15" in physical cell address are the "seventh" through "11th" cells out of the cells storing magnetic tape cartridges as counted from the smallest physical cell address upward, the physical cell addresses "11" through "15" and the logical cell addresses "7" through "11" are matched with each other as shown in FIG. 5(D). Since only magazines A and B are present in this example, processing is completed hereupon, but if there is any other magazine, similar processing will be performed.

It is noted that the method for generating a cell position correspondence table described above is nothing more than an example. Thus, the cell position correspondence table can be generated by some other method. It is also conceivable to register in memory unit 311 a cell position correspondence table generated for each combination of the numbers of rolls of magnetic tape cartridges that can be stored in magazines A and B ("1 roll and 0 roll", "1 roll and 1 roll", . . . , "10 rolls and 9 rolls" and "10 rolls and 10 rolls"), each table being matched with a combination of the numbers of rolls, and to select a cell position correspondence table to be registered in table-in-use memory unit 312 on the basis of the number of stored rolls of magazines A and B registered in stored number of rolls memory unit 314.

On the other hand, backup program 102 operating on higher level device 100, when the total number of rolls and pairs each of a logical cell address and a label content are sent from magnetic tape library 1, registers the total number of rolls in the stored number of rolls memory unit 104 and the pairs of logical cell addresses and label contents in logical cell address/label content memory unit 105 (steps S121 and S122 in FIG. 12).

Next, the operation at the time of backing-up will be described.

The backup personnel for higher level device 100, when data (a file) stored in memory device 108 are to be backed-up in magnetic tape library 1, inputs a backup instruction from input unit 106. This causes backup program 102 operating on higher level device 100 to generate a backup instruction screen 141 shown in FIG. 14 on the basis of the pairs of logical cell addresses and label contents registered in logical cell address/label content memory unit 105 and to generate it on display unit 107 (step S131 in FIG. 13).

Figure 14:
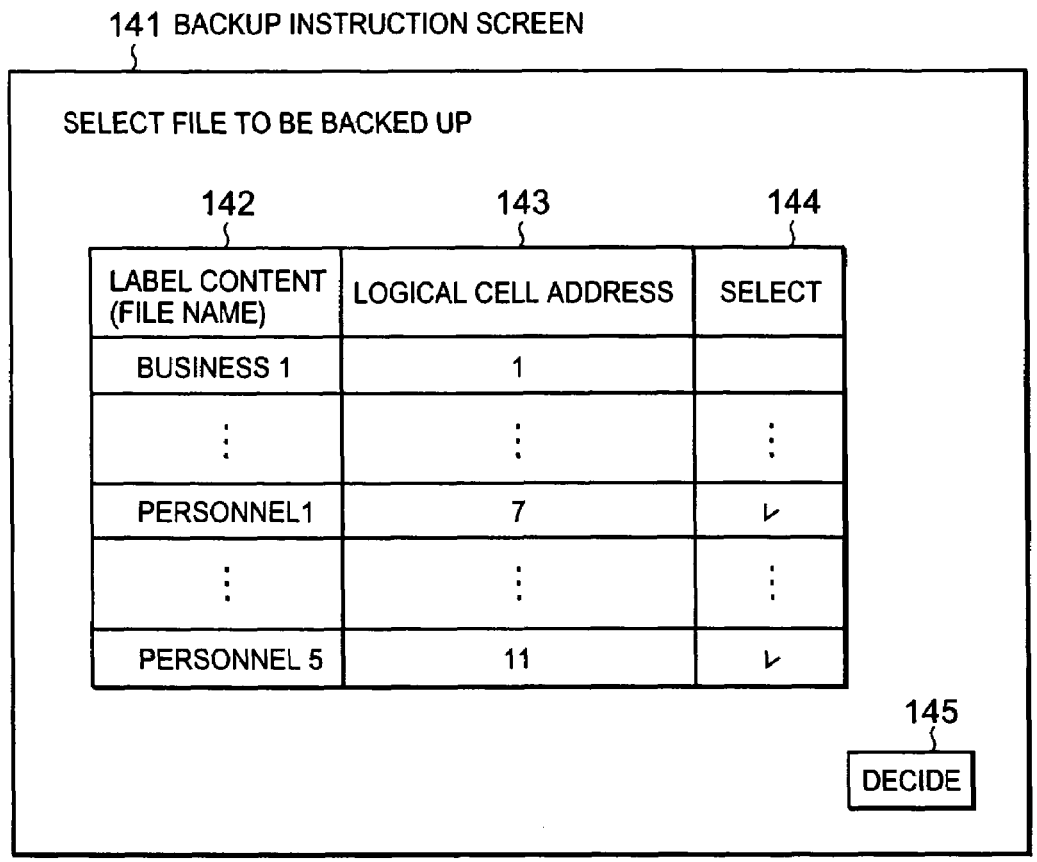
FIG. 14 shows an exemplary chart showing an exemplary backup instruction screen 141.

Referring to FIG. 14, the backup instruction screen 141 has a label content display column 142, a logical cell address display column 143, a selection column 144 and a decision button 145.

The label content display column 142 shows label contents stored in logical cell address/label content memory unit 105. Incidentally in this exemplary embodiment, one label content is supposed to represent the file name of one specific file out of the files stored in memory device 108.

The logical cell address display column 143 shows the logical cell addresses stored in logical cell address/label content memory unit 105.

The selection column 144 is a column for use in selecting a file to be backed up, and in the example shown in FIG. 14, files having file names of "Personnel 1" through "Personnel 5" are selected.

The decision button 145 is a button to be manipulated by the backup personnel after all the files to be backed-up have been selected.

The backup personnel, when the backup instruction screen 141 shown in FIG. 14 is displayed on display unit 107, select files to be backed-up by using the selection column 144 and, having selected all the files to be backed up, manipulate the decision button 145.

This causes backup program 102 to note one of the rows for which a check is marked in the selection column 144, and transmits a backup request containing a logical cell address in that row to magnetic tape library 1 (step S132). If for instance it notes the row containing the label content "Personnel 1" and the logical cell address "7", then a backup request containing the logical cell address "7" will be transmitted to magnetic tape library 1.

Figure 15:
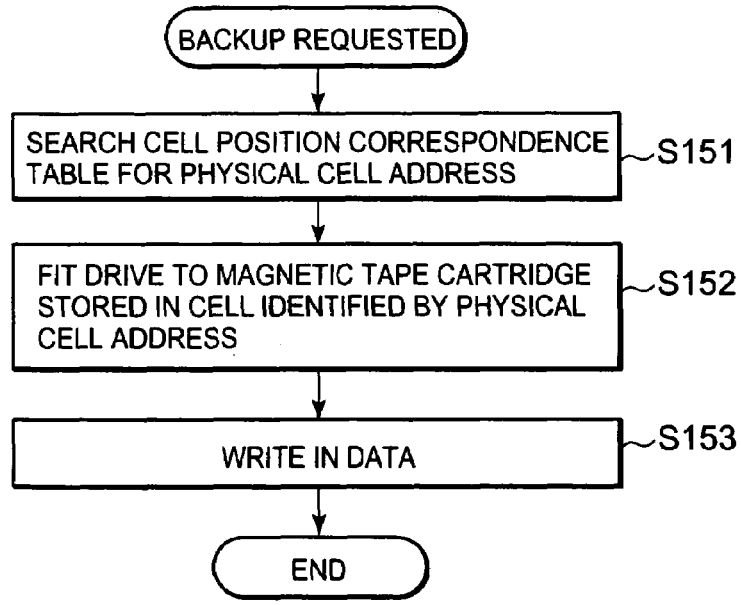
FIG. 15 shows an exemplary flow chart showing an exemplary processing by backup control unit 307.

Backup control unit 307 in magnetic tape library 1, when it has received the backup request containing the logical cell address "7", inputs to converting means 308 a conversion instruction containing the logical cell address "7". This causes converting means 308 to reference a cell position correspondence table stored in table-in-use memory unit 312, and finds out a physical cell address corresponding to the logical cell address "7" (step S151 in FIG. 15). If the cell position correspondence table stored in table-in-use memory unit 312 is what is shown in FIG. 5(D), then converting means 308 will search for a physical cell address "11" corresponding to the logical cell address "7".

Thereafter, backup drive unit control means 309 controls carrier table drive unit 316 and carrier drive unit 317, and fits to drive 2, magnetic tape cartridge 14 stored in the cell of "11" in physical cell address (step S152). Also, backup control unit 307, upon completion of the fitting of magnetic tape cartridge 14, requests higher level device 100 for backup data.

Backup program 102 on higher level device 100, when requested for backup data, inputs from memory device 108 a file having the same file name as the label content "Personnel 1" in the currently noted row, and transmits the file to magnetic tape library 1 (step S133 in FIG. 3).

Backup control unit 307 in magnetic tape library 1, by using data writing means 310, writes the file sent from higher level device 100 into magnetic tape cartridge 14 fitted to drive 2 and, upon completion of writing, notifies higher level device 100 accordingly (step S153).

Backup program 102 on higher level device 100, is notified by magnetic tape library 1 of the completion of writing, whether or not there is any unnoted row among the rows for which a check is marked in the selection column 144. If there are unnoted row(s), then program 102 will note one of those rows and perform the above-described processing of steps S132 and S133. If there is no unnoted row, then the processing will be ended.

[Exemplary Advantage of the First Exemplary Embodiment]

In the first exemplary embodiment, even if the number of rolls of magnetic tape cartridges 14 actually stored in magnetic tape library 1 is made the number of rolls contracted for with the right holder (e.g., owner etc.) of backup program 102 operating on higher level device 100, allocates different magazines A through D are allocated to the media pools m1 through m4, and allows loading and unloading of magnetic tape cartridges 14 in media pool units, thereby resulting in easier management of the loading and unloading of magnetic tape cartridges.

For instance, where magnetic tape cartridges (eight volumes for each media pool, 32 volumes in total) belonging to the media pools m1 through m4 are to be stored into magazines A through D each having 10 cells, the contracted number of rolls would have to be "38 rolls" matching the largest physical cell address "38" as shown in FIG. 21 according to the conventional art. However, the first exemplary embodiment can make it "32 rolls", which is the number of actually stored rolls of magnetic tape cartridges, as shown in FIG. 16.

In addition, for example, backup program 102 in higher level device 100 may recognize the physical cell addresses "1" through "32", even if backup program 102 in higher level device 100 can recognize only consecutive physical addresses.

Further according to the present invention, if the total number of rolls stored in magazines 11 is not greater than the contracted number of rolls, then even if the quantity of backup data for any media pool increases and necessitates increasing the number of magnetic tape cartridges, a newly added magnetic tape cartridge 14 can be stored into a magazine 11 allocated to the media pool.

Figure 16:
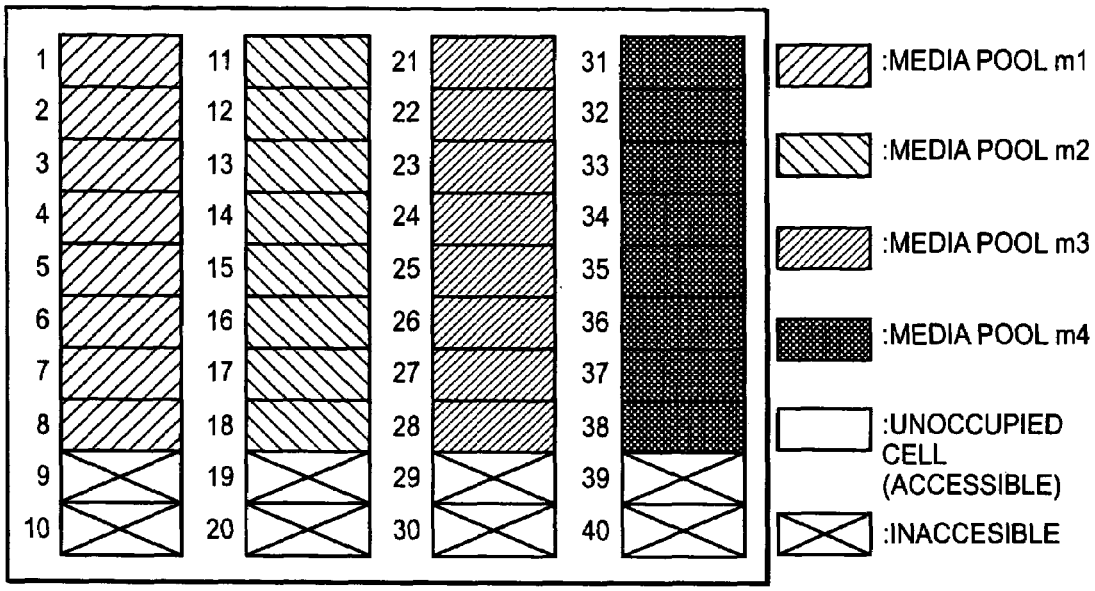
FIG. 16 shows an exemplary chart for illustrating the exemplary effects of the first exemplary embodiment.
Figure 17:
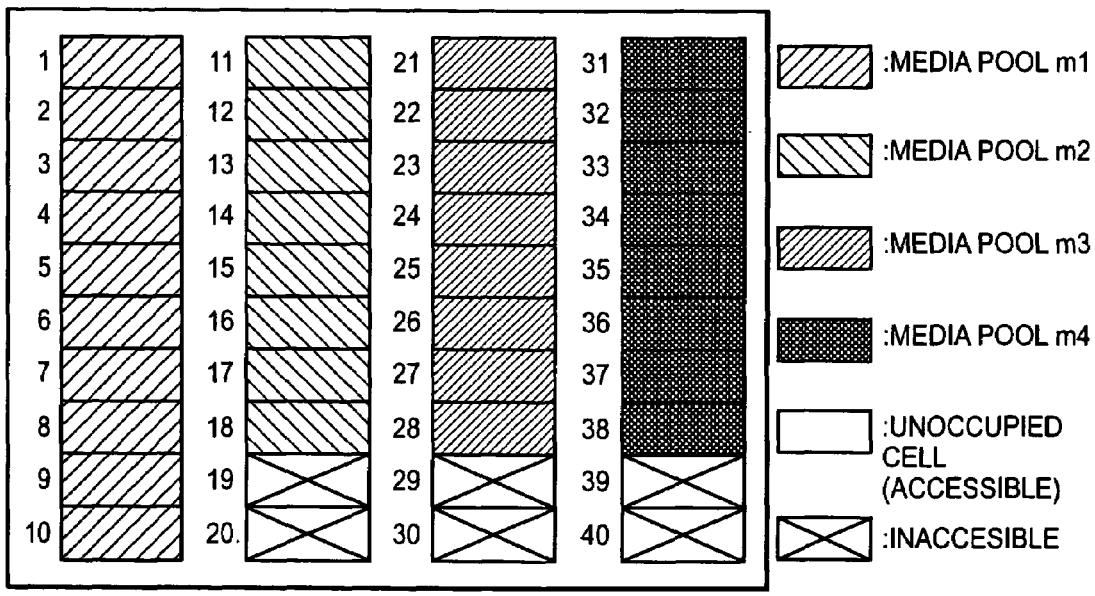
FIG. 17 shows an exemplary chart for illustrating the exemplary effects of the first exemplary embodiment.

For instance in a state in which magnetic tape cartridges belonging to the media pools m1 through m4 are stored in magazines A through D as shown in FIG. 16, if the contracted number of rolls is made "34 rolls", then even if the quantity of backup data for the media pool m1 increases and necessitates increasing the number of magnetic tape cartridges, a magnetic tape cartridge belonging to the added media pool m1 can be stored into magazine A, to which the media pool m1 belongs, as shown in FIG. 17.

The above-described advantages are achieved by the data storage medium library (e.g., magnetic tape library 1) including a plurality of magazines A-B, and the magazine including a plurality of cells 15. The data storage medium library (e.g., magnetic tape library 1) includes an addressor (e.g., stored roll number detecting means 304) that addresses a logical cell address of the cell 15 that stores a data storage medium (e.g., magnetic tape cartridges). The logical cell address indicates what number the cell is as counted in ascending order in the cells that store the data storage medium. For example, when the addressor counts, the addressor skips an empty cell (e.g., the addressor may skip counting the empty cell (e.g., the physical cell address "9" and "10" in FIG. 16) found between adjacent ones (e.g., the physical cell address "8" and "11" in FIG. 16) of the cells storing a data storage medium.). The data storage medium library also includes a reporter (e.g., reporting means 305) that reports the logical cell address to a host device.

In other words, for example, even when magnetic tape cartridges are stored as shown in FIG. 21, the higher level device connected to the magnetic tape library in the exemplary embodiments of the present invention may recognize that magnetic tape cartridges are stored, as shown in FIG. 20. Thus, for example, the higher level device may recognize physical addresses as consecutive physical cell addresses and the maximum physical cell address as "32".

Moreover, for example, the first exemplary embodiment allows accurate perception of the number of rolls of magnetic tape cartridges 14 stored in each of magazines 11. That is, shutter 12 can be fixed to block the inlets/outlets of any number of cells in the descending order of physical cell addresses, and the number of stored rolls of magnetic tape cartridges 14 is detected by using magazines 11 having shutters 12. The shutters 12 have labels fitted thereto for terminal point detection.

[Second Exemplary Embodiment]

Next, a second exemplary embodiment of a magnetic tape library pertaining to the present invention will be described. While in the first exemplary embodiment, the number of stored rolls of magnetic tape cartridges in each of magazines A and B is detected by using magazines A and B each provided with shutter 12, this exemplary embodiment dispenses with the shutters 12 of magazines A and B by having the user directly input the number of stored rolls of magnetic tape cartridges in each of magazines A and B from an operation panel 20 (FIG. 18).

[Configuration of the Second Exemplary Embodiment]

Figure 18:
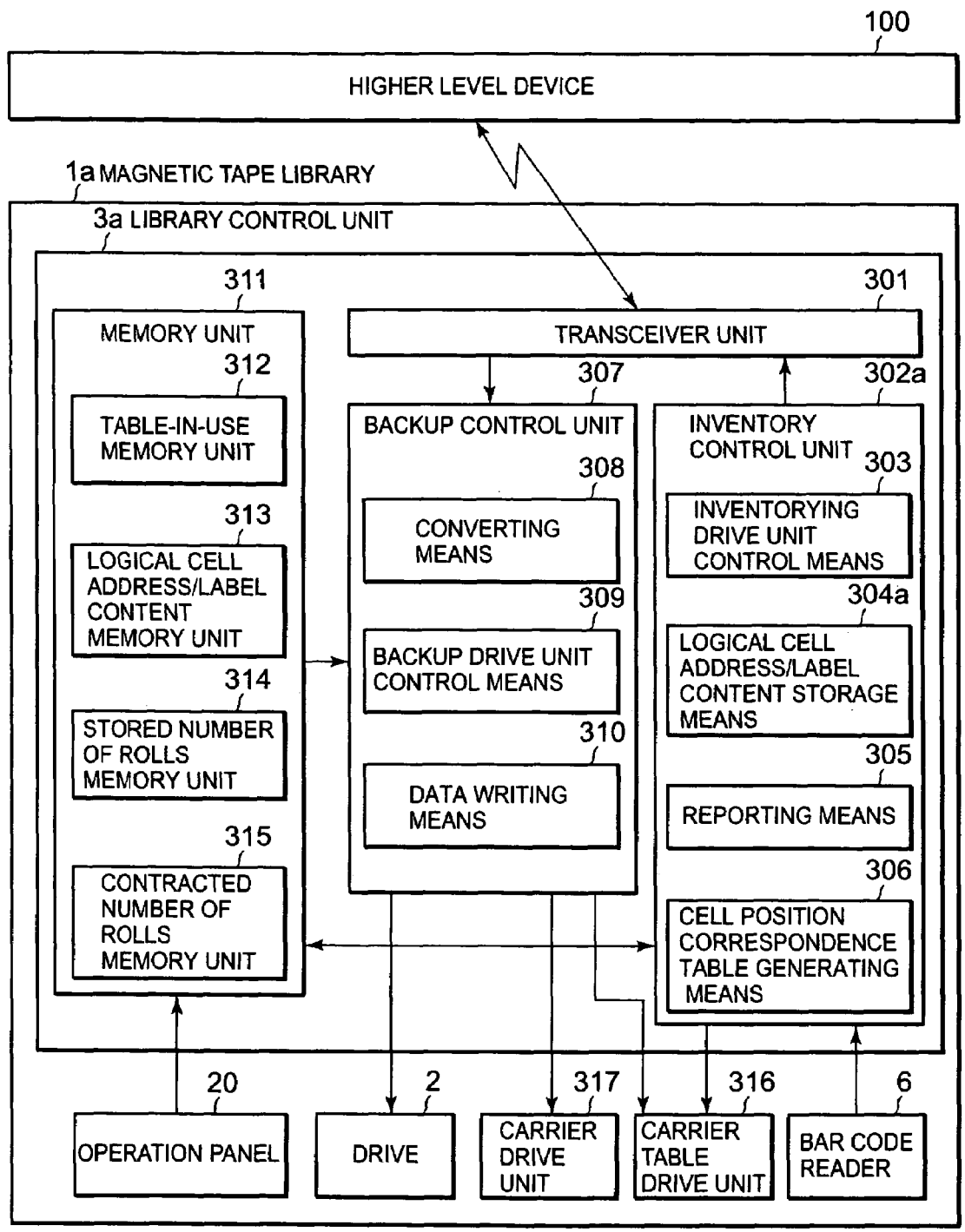
FIG. 18 shows an exemplary block diagram showing an exemplary configuration of a second exemplary embodiment of a magnetic tape library 1a according to the present 7 invention.

FIG. 18 is an exemplary block diagram showing an exemplary configuration of a second exemplary embodiment of magnetic tape library 1a pertaining to the invention. Magnetic tape library 1a of this exemplary embodiment and magnetic tape library 1 shown in FIG. 4 differ in that library control unit 3a is used in place of library control unit 3 and that operation panel 20 is provided. Library control unit 3a differs from library control unit 3 in that inventory control unit 302a is provided in place of inventory control unit 302. Library control unit 302a differs from library control unit 302 in that logical cell address/label content storage means 304a is provided in place of stored roll number detecting means 304.

[Operation of the Second Exemplary Embodiment]

Next, the operation of this second exemplary embodiment will be described. Incidentally, as it is similar to the first exemplary embodiment except in inventorying operation, only the inventorying operation will be described here.

The user, when having removed magazines A and B from magnetic tape library 1a and loading or unloading magnetic tape cartridges 14, inputs from the input device (e.g., operation panel 20) the number of stored rolls of magnetic tape cartridges 14 in magazines A and B. The number of stored rolls of magnetic tape cartridges 14 in each of magazines A and B inputted from operation panel 20 is written into stored number of rolls memory unit 314 by writing means whose illustration is dispensed with. Thereafter, the user inserts magazines A and B into magnetic tape library 1a.

Figure 19:
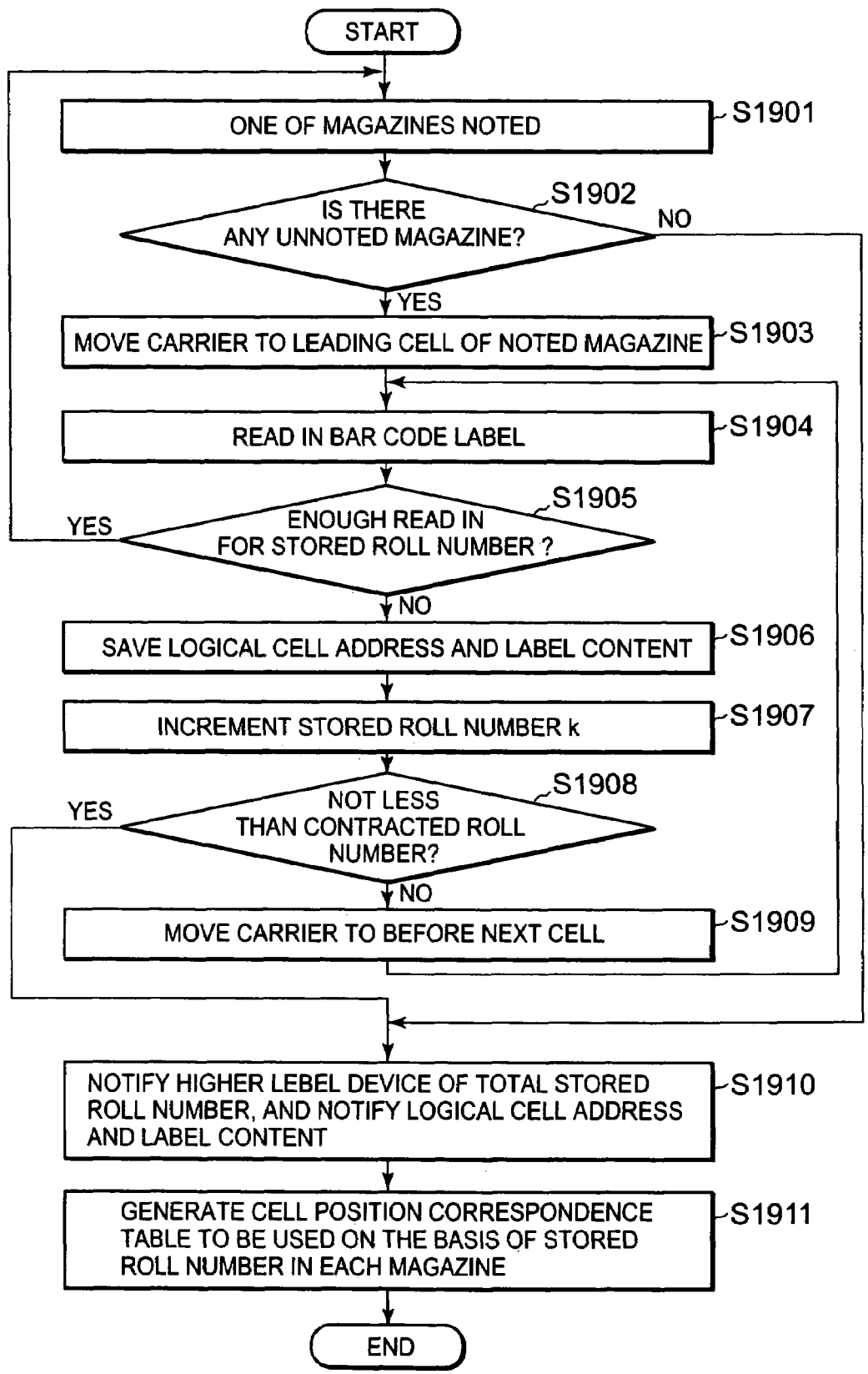

Inventory control unit 302a, when it detects the turning-on of the power supply of the loading of a magazine, notes magazine A having the cell of the smallest physical cell address out of the unnoted magazines A and B, as shown in FIG. 19 (step S1901).

Thereafter, inventorying drive unit control means 303 controls carrier table drive unit 316 to move carrier 5 to before the first cell of the noted magazine A (step S1903). This causes bar code reader 6 to read bar code label 17 stuck to magnetic tape cartridge 14 in which the cell is stored (step S1904).

Logical cell address/label content storage means 304a judges whether or not the contents of bar code labels 17 have already been read in the noted magazine A from magnetic tape cartridges 14 for the number of stored rolls in magazine A registered in stored number of rolls memory unit 314 (step S1905).

If bar code labels 17 have been read from magnetic tape cartridges 14 for the number of stored rolls in magazine A stored in stored number of rolls memory unit 314 ("YES" at step S1905), then the next magazine B will be noted (step S1901). On the other hand, if they have not yet been read (NO at step S1905), then the logical cell address of cell 15 in which magnetic tape cartridges 14 whose bar code label 17 was read is stored and the label content that has been read are matched with each other, and they are registered in logical cell address/label content memory unit 313 (step S1906). Thereafter, logical cell address/label content storage means 304a increments (e.g., adds+1) to the value of a variable k representing the number of rolls stored in the noted magazine, and further checks whether or not the number of rolls of magnetic tape cartridges 14 which have read the bar code level 17 has reached the contracted number of rolls stored in contracted number of rolls memory unit 315 (steps S1907 and S1908).

If it is determined that the contracted number of rolls has not been reached ("NO" at step S1908), then inventorying drive unit control means 303 will control carrier table drive unit 316 to move carrier 5 to before the cell next to the noted magazine A (the second cell 15) (step S1909). This causes bar code reader 6 to read the bar code label (step S1904).

On the other hand, if it is determined that the contracted number of rolls has been reached (YES at step S1908), then reporting means 305 notifies higher level device 100 of the total number of rolls of magnetic tape cartridges 14 stored in magnetic tape library 1a, and pairs each of a logical cell address and a label content registered in logical cell address/label content memory unit 313 (step S1910). Thereafter, cell position correspondence table generating means 306 generates a cell position correspondence table on the basis of the number of rolls stored in each of magazines A and B, registered in stored number of rolls memory unit 314, and registers the generated cell position correspondence table in table-in-use memory unit 312 (step S1909).

[Exemplary Advantages of the Second Exemplary Embodiment]

In addition to the effects which the first exemplary embodiment has, the second exemplary embodiment allows an economical configuration of magazines provided with no shutter 12, for example. The reason may be that input means (for instance, operation panel 20) is provided for inputting the number of rolls of magnetic tape cartridges 14 stored in each magazine 11, and that converting means 308 has a configuration in which a physical cell address matching the logical cell address is found out on the basis of the number of stored rolls of magnetic tape cartridges 14 in each of magazines 11, inputted from the input means 20.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

Further, the inventor's intent is to encompass all equivalents of all the elements of the claimed invention even if the claims are amended during prosecution.

This application is based on Japanese Patent Application No. 2005-006266 filed on Jan. 13, 2005 and including specification, claims, drawings and summary. The disclosure of the above Japanese Patent Application is incorporated herein by reference in its entirety.

What is claimed is:

1. A data storage medium library, comprising:
   a plurality of magazines, said magazines including a plurality of cells;
   an addressor that addresses a logical cell address of said cell that stores a data storage medium, said logical cell address indicating what number said cell is as counted in ascending order in the cells that store data storage media; and
   a reporter that reports said logical cell address to a host device,
   wherein, when said addressor counts, said addressor skips an empty cell.

2. The data storage medium library according to claim 1, wherein each said cell is assigned a physical cell address which identifies each said cell in said data storage library, said data storage medium library further comprising:
   a converter that determines said physical cell address corresponding to a logical cell address, when a request including said logical cell address is sent from said host device.

3. The data storage medium library according to claim 2, further comprising:
   a drive unit controller that controls a drive unit and a drive, so that said drive unit transports the data storage media stored in the cell of said physical cell address to a drive and said drive writes data sent from said host device onto said data storage medium.

4. The data storage medium library according to claim 2, further comprising:
   a stored medium number detector that detects the number of said data storage media stored in each of said magazines,
   wherein said converter determines said physical cell address corresponding to said logical cell address on the basis of said number of said data storage media stored in each of said magazines detected by said stored medium number detector.

5. The data storage medium library according to claim 4, further comprising:
   a cell position correspondence table generator that generates a cell position correspondence table indicating correspondence between said logical cell address and said physical cell address on the basis of said number of said data storage media stored in each of said magazines detected by said stored medium number detector and said physical cell addresses of said cells in each of said magazines,
   wherein said converter determines a physical cell address corresponding to said logical cell address on the basis of said cell position correspondence table.

6. The data storage medium library according to claim 4, further comprising:
   a reader that reads a label; and
   a boundary label that shows a boundary between a cell storing a medium and an empty cell,
   wherein said stored medium number detector detects the number of the data storage media stored in said magazine on the basis of the position where said reader reads said boundary label.

7. The data storage medium library according to claim 6, further comprising:
   an inventorying drive unit controller that moves said reader from the leading cell of said magazine toward cells whose physical cell addresses are larger and makes said reader read the label at the inlet/outlet of each cell,
   wherein said magazine includes a shutter capable of sliding on the front face of said magazine where said inlet/outlet of each of said cells is provided and being fixed in a form blocking the inlets/outlets of cells in any desired number from a larger of physical cell addresses downward, and
   wherein said shutter includes said boundary label for terminal point detection in a position matching the inlet/outlet of the cell whose physical cell address is smallest among those whose inlets/outlets are blocked.

8. The data storage medium library according to claim 4, further comprising:
   an input device that inputs the number of the data storage media stored in each of said magazines,
   wherein said stored medium number detector detects the number of the data storage media stored in said magazine on the basis of the number of the data storage media stored in each of said magazines inputted from said input device.

9. The data storage medium library according to claim 1, wherein said addressor skips counting said empty cell found between adjacent ones of said cells storing a data storage medium.

10. A data storage medium magazine, comprising:
    a plurality of cells that stores a data storage medium; and
    a shutter being slidable on the front face of said magazine where an inlet/outlet of each of said cells is provided and being fixed in a form blocking the inlets/outlets of cells in any desired number from a larger of the physical cell addresses downward, said shutter including a boundary label for terminal point detection in a position matching the inlet/outlet of the cell whose physical cell address is smallest among those whose inlets/outlets are blocked.

11. A host device, comprising:
    a receiver that receives a logical cell address from a data storage medium library; and
    a transmitter that transmits a request including said logical cell address to said data storage medium library,
    wherein said data storage medium library includes:
    a plurality of magazines, said magazines including a plurality of cells;
    an addressor that addresses a logical cell address of a cell that stores a data storage medium, said logical cell address indicating what number said cell is as counted in ascending order in the cells that store a data storage medium; and a reporter that reports said logical cell address to a host device, wherein when said addressor counts, said addressor skips an empty cell.

12. A data storage medium library system, comprising:

a data storage medium library including:

a plurality of magazines, said magazines including a plurality of cells;

an addressor that addresses a logical cell address of said cell that stores a data storage medium, said logical cell address indicating what number said cell is as counted in ascending order in the cells that store a data storage medium; and a reporter that reports said logical cell address to a host device, said host device including: a receiver that receives said logical cell address from a data storage medium library; and a transmitter that transmits a request including said logical cell address to said data storage medium library, wherein when said addressor counts, said addressor skips an empty cell.

13. A method of operating a data storage medium library, comprising:

providing a plurality of magazines, said magazines including a plurality of cells;

addressing a logical cell address of said cell that stores a data storage medium, said logical cell address indicating what number said cell is as counted in ascending order in the cells that store a data storage medium;

reporting said logical cell address to a host device; and skipping an empty cell, when said addressor counts.

14. The method of operating a data storage medium library according to claim 13, further comprising:

providing said cell that is assigned a physical cell address which identifies each said cell in said data storage library; and determining said physical cell address corresponding to a logical cell address, when a request including said logical cell address is sent from said host device.

15. The method of operating a data storage medium library according to claim 14, further comprising:

controlling a drive unit and a drive so that said drive unit transports the data storage media stored in the cell of said physical cell address to a drive and said drive writes data sent from said host device onto said data storage medium.

16. The method of operating a data storage medium library according to claim 14, further comprising:

detecting the number of said data storage media stored in each of said magazines; and determining said physical cell address corresponding to said logical cell address on the basis of said number of said data storage media stored in each of said magazines.

17. The method of operating a data storage medium library according to claim 16, further comprising:

generating a cell position correspondence table indicating correspondence between said logical cell address and said physical cell address on the basis of said number of said data storage media stored in each of said magazines detected by said stored medium number detector and said physical cell addresses of said cells in each of said magazines; and determining a physical cell address corresponding to said logical cell address on the basis of said cell position correspondence table.

18. The method of operating a data storage medium library according to claim 16, further comprising:

providing a boundary label that shows a boundary between a cell storing a medium and an empty cell;

reading said boundary label; and detecting the number of data storage media stored in said magazine on the basis of the position where said reader reads said boundary label.

19. The method of operating a data storage medium library according to claim 18, further comprising:

moving said reader from the leading cell of said magazine toward cells whose physical cell addresses are larger and makes said reader read the label at the inlet/outlet of each cell; and providing a shutter with said magazine, said shutter being slidable on the front face of said magazine where said inlet/outlet of each of said cells is provided and is fixed in a form blocking the inlets/outlets of cells in any desired number from a larger of the physical cell addresses downward, said shutter including said boundary label for terminal point detection in a position matching the inlet/outlet of the cell whose physical cell address is smallest among those whose inlets/outlets are blocked.

20. The method of operating a data storage medium library according to claim 16, further comprising:

inputting the number of the data storage media stored in each of said magazines;

detecting the number of the data storage media stored in said magazine on the basis of the number of the data storage media stored in each of said magazines inputted from an input device.

21. The method of operating a data storage medium library according to claim 13, comprising:

skipping counting said empty cell found between adjacent ones of said cells storing a data storage medium.

22. A method of operating a host device, comprising:

receiving a logical cell address from a data storage medium library; and transmitting a request including said logical cell address to said data storage medium library, in said data storage medium library:

providing a plurality of magazines, said magazines including a plurality of cells;

addressing a logical cell address of said cell that stores a data storage medium, said logical cell address indicating what number said cell is as counted in ascending order in the cells that store a data storage medium; and skipping a cell, when said addressor counts, if the cell is empty; and reporting said logical cell address to a host device.

23. A method of operating a data storage medium library system, comprising:

providing a plurality of magazines, said magazines including a plurality of cells;

addressing a logical cell address of said cell that stores a data storage medium, said logical cell address indicating what number said cell is as counted in ascending order in the cells that store a data storage medium;

skipping a cell, when said addressor counts, if the cell is empty;

reporting said logical cell address to a host device;
receiving said logical cell address from a data storage medium library; and
transmitting a request including said logical cell address to said data storage medium library.

24. A signal-bearing medium embodying a program of machine-readable instructions executable by a digital processing apparatus, said program causing a data storage medium library to perform a method of claim 13.

25. A signal-bearing medium embodying a program of machine-readable instructions executable by a digital processing apparatus, said program causing a host device to perform a method of claim 22.

* * * * *